US012676005B2

(12) United States Patent
Ryan

(10) Patent No.: US 12,676,005 B2
(45) Date of Patent: Jul. 7, 2026

(54) IMAGE LABELLING SYSTEM AND METHOD THEREFOR

(71) Applicant: SITA Information Networking Computing Canada Inc., Montreal (CA)

(72) Inventor: Sid Ryan, Montreal (CA)

(73) Assignee: SITA Information Networking Computing Canada Inc., Montreal (CA)

( * ) Notice: Subject to any disclaimer, the term of this patent is extended or adjusted under 35 U.S.C. 154(b) by 367 days.

(21) Appl. No.: 18/302,386

(22) Filed: Apr. 18, 2023

(65) Prior Publication Data

US 2023/0260287 A1 Aug. 17, 2023

Related U.S. Application Data

(63) Continuation of application No. PCT/CA2021/051463, filed on Oct. 18, 2021.

(30) Foreign Application Priority Data

Oct. 19, 2020 (EP) .................................... 20202528

(51) Int. Cl.
*G06V 20/54* (2022.01)
*G06T 7/70* (2017.01)
(Continued)

(52) U.S. Cl.
CPC ................ *G06V 20/54* (2022.01); *G06T 7/70* (2017.01); *G06V 10/764* (2022.01); *G06V 20/44* (2022.01);
(Continued)

(58) Field of Classification Search
CPC ...... G06V 20/54; G06V 10/764; G06V 20/44; G06V 2201/07; G06T 7/70; G06T 2207/10028
See application file for complete search history.

(56) References Cited

U.S. PATENT DOCUMENTS 10,607,116 B1 * 3/2020 Omer ............... G06Q 10/06393
2002/0082769 A1 6/2002 Church et al.
(Continued)

FOREIGN PATENT DOCUMENTS

CN 1568489 A 1/2005
CN 103676829 A 3/2014
(Continued)

OTHER PUBLICATIONS

International Search Report and Written Opinion, issued in International Application No. PCT/CA2021/051463, mailed Jan. 12, 2022.
(Continued)

*Primary Examiner* — Matthew C Bella
*Assistant Examiner* — Jinsu Hwang
(74) *Attorney, Agent, or Firm* — Bradley Arant Boult Cummings LLP; Daniel E. Sineway, Esq.; Adam J. Thompson, Esq.

(57) ABSTRACT

A system for generating a labelled dataset is provided. The system comprises processor configured to: receive first data wherein the first data comprises one or more frames and wherein the first data comprises data defining an object of interest within a predetermined area; receive second data wherein the second data is associated with the object of interest within the predetermined area; analyse the one or more frames of the first data to identify, based on the second data, the object of interest present in the first data; label the one or more frames of the first data based on the analysis to
(Continued)

generate a labelled dataset; and output the labelled dataset. Also provided is a method for generating a labelled dataset, a system for training a machine learning model, and a detection system for detecting one or more objects of interest.

19 Claims, 10 Drawing Sheets

(51) Int. Cl.
  *G06V 10/764*        (2022.01)
  *G06V 20/40*        (2022.01)
(52) U.S. Cl.
  CPC ............... *G06T 2207/10028* (2013.01); *G06V 2201/07* (2022.01)

(56)                References Cited

U.S. PATENT DOCUMENTS

| | | |
|---|---|---|
| 2017/0061249 A1 | 3/2017 | Estrada et al. |
| 2019/0031346 A1 | 1/2019 | Yong et al. |
| 2019/0162549 A1 | 5/2019 | Fouad et al. |
| 2020/0012883 A1 | 1/2020 | Kuo et al. |
| 2020/0125845 A1 | 4/2020 | Wolfgang et al. |
| 2020/0134339 A1 | 4/2020 | Zucker et al. |
| 2020/0265247 A1 | 8/2020 | Musk et al. |

FOREIGN PATENT DOCUMENTS

| | | |
|---|---|---|
| CN | 103733234 A | 5/2017 |
| CN | 108875555 A | 11/2018 |
| CN | 109409283 A | 3/2019 |
| CN | 110249604 A | 9/2019 |
| CN | 110914700 A | 3/2020 |
| CN | 111615703 A | 9/2020 |
| WO | 2011061770 A1 | 5/2011 |

OTHER PUBLICATIONS

Extended European Search Report issued in European Application No. EP 20202528.4, dated Mar. 31, 2021.
International Preliminary Report on Patentability for International Application No. PCT/CA2021/051463, mailed May 4, 2023, 9 Pages.
Office Action issued in Chinese application No. 202180077962.5, dated Oct. 17, 2025 (7 pages).
Office Action issued in Chinese application No. 202180077962.5, dated Jun. 13, 2025 (12 pages).

* cited by examiner

701

Automatic distance adjustment to jet bridge

702

Latitude
Longitude
Aircraft type
Park location

IMAGE LABELLING SYSTEM AND METHOD THEREFOR

CROSS REFERENCE TO RELATED APPLICATIONS

This application is a continuation of International Patent Application No. PCT/CA2021/051463, filed Oct. 18, 2021, and entitled "IMAGE LABELLING SYSTEM AND METHOD THEREFOR," which claims the benefit of and priority to European Application No. 20202528.4, filed Oct. 19, 2020, and entitled "IMAGE LABELLING SYSTEM AND METHOD THEREFOR," each of which are incorporated by reference in their entirety herein.

FIELD OF THE INVENTION

This invention relates to systems and methods for labelling images to identify and monitor objects of interest. Further, this invention relates to image processing and machine learning methods and systems. It is particularly, but not exclusively, concerned with identifying and labelling objects or entities of interest that are captured in a series of images. This invention also concerns training of machine learning models. The trained machine learning models can uniquely identify objects in videos and images and track their positions. Further, the machine learning models can detect anomalies to prevent damages or accidents. In addition, trained models can be used to remotely control moving objects to autonomously perform their tasks.

BACKGROUND OF THE INVENTION

Current machine learning models use manually annotated objects for the training phase. The process of labelling is cumbersome and manual performance and quality of labelling is strongly related to the knowledge of the individual, biases in performing the tasks, and often decreases by distractions or tiredness of the experts.

Almost all of the service operations in transportation systems heavily rely on human labour and the experience of the crew directly effects the quality of services. The variation in decision making and providing services results in an uncontrollable and non-uniform service quality. Distractions or tiredness of the operator can result in errors that downstream can produce catastrophic consequences in complex environments such as in transportation industry.

SUMMARY OF THE INVENTION

Embodiments of the invention seek to address the problems described above by providing a system that labels data of moving equipment and vehicles from cameras or other monitoring sensors. Particularly, embodiments of the invention make use of data from one or more proximity sensors or in other words proximity detectors to identify or detect objects of interest in raw data from one or more monitoring sensors. Advantageously, the embodiments of the invention do not require a human operator with domain-specific knowledge to perform a manual annotation of the data. Instead, the data from the one or more proximity sensors is used to annotate the data from the one or more monitoring sensors. Embodiments of the invention are thereby able to automatically generate labelled datasets.

In further embodiments of the invention, the labelled datasets are used for the training of machine learning models. The machine learning models are trained using the labelled datasets to identify particular objects of interest such as moving equipment or vehicles which may be captured in monitoring sensor data.

In further embodiments of the invention, the trained machine learning models are used to identify objects of interest such as moving equipment or vehicles captured in monitoring sensor data. The identified objects of interest are localised in order to provide tracking, generate alerts in response to predicted collisions, improve services and provide guidance.

Embodiments of the invention can predict downstream effects of decisions and anticipate the outcome of a scenario to avoid undesirable actions.

Also disclosed is a method for generating the labelled data set or for training a machine learning model or for detecting one or more objects of interest, and a computer program product which when executed performs the method for generating the labelled data set or for training a machine learning model or for detecting one or more objects of interest.

DETAILED DESCRIPTION

Figure 1:
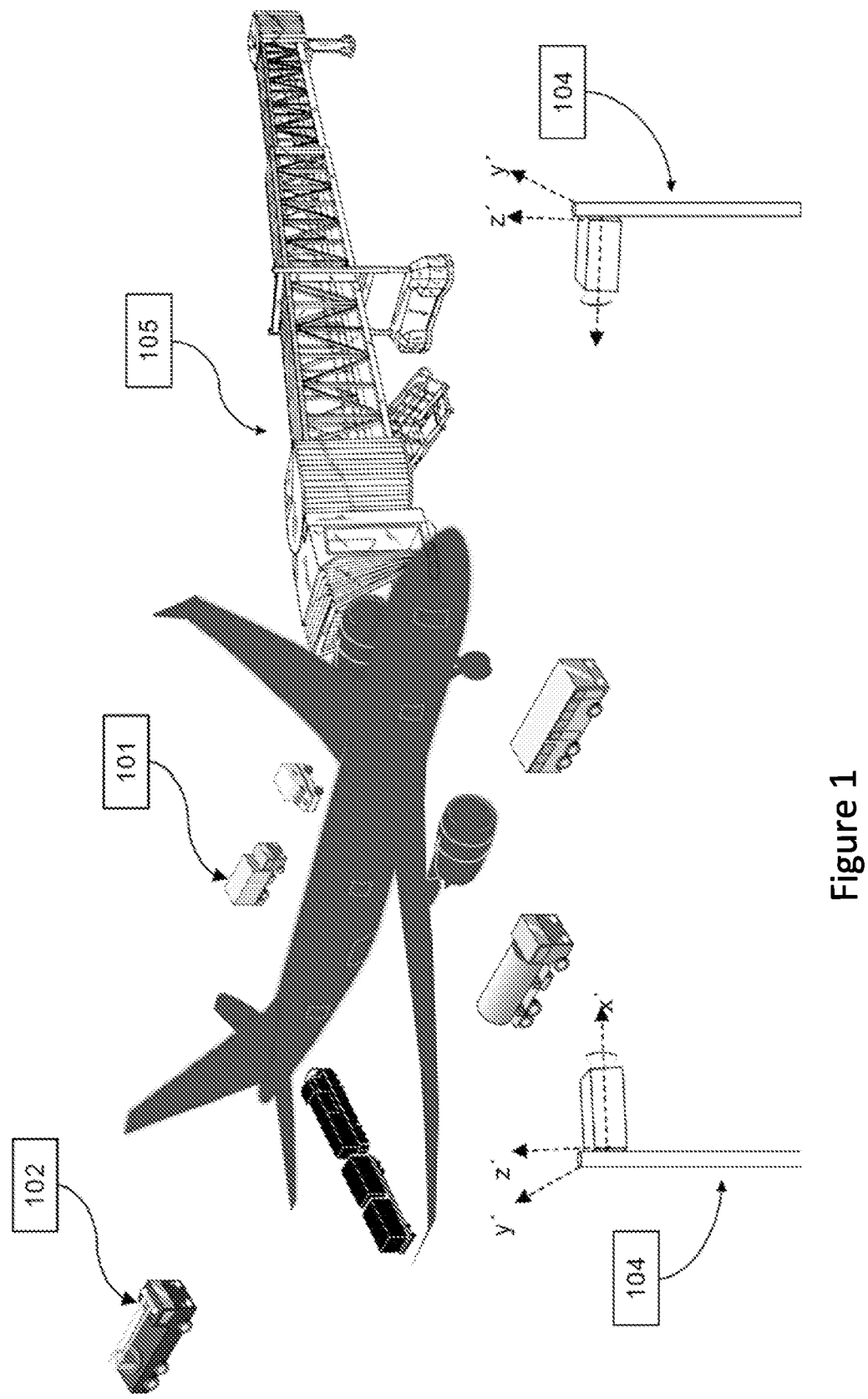
FIG. 1 shows an aircraft in situ on a typical airport apron, within the field of view of one or more monitoring sensors such as a camera.

The following exemplary description is based on a system, apparatus, and method for use in the aviation industry. However, it will be appreciated that the invention may find application outside the aviation industry, including in other transportation industries, or delivery industries where items are transported between locations, or industries involving the coordination of multiple vehicles. For example, embodiments of the invention may also find application in the shipping, rail or road industries.

The following embodiments described may be implemented using a Python programming language using for example OpenCV™, Tensorflow™ and Keras™ libraries.

Embodiments of the invention have two main phases:

1—Annotating data in order to train machine learning models for unique identification of objects.

2—Monitoring and controlling of equipment and vehicles in the environment and analysis of decisions outcomes for optimal operations.

Dataset Creation Phase

Monitoring data of objects of interest is captured by one or more monitoring sensors such as cameras, LiDARs, or Time-of-Flight cameras. The monitoring sensors are also referred to as first sensors. The one or more monitoring sensors generate monitoring sensor data. The monitoring sensor data is also referred to as first data. The monitoring sensor data may comprise one or more frames. Each frame may comprise an image, a point cloud or other sensor data captured at an instant in time, and an associated timestamp indicating a time at which the image, point cloud or other sensor data was captured.

Proximity devices, with an associated unique identifier, are installed on each object of interest of a plurality of objects of interest. For example, on each vehicle of a fleet of vehicles.

One or more proximity sensors or in other words proximity detectors are installed at location-of-interest. The proximity sensors or proximity detectors are also referred to as second sensors. The second sensors detect second data. The proximity detectors detect the presence of a transmitter or proximity device installed on, attached to, or coupled to an object of interest. Usually the proximity sensor is installed at one end of a passenger boarding bridge which allows passengers to disembark to or board from an airport terminal. Other locations are possible.

Each bridge is usually moveable on the apron so that it can be positioned in close proximity to the rest position of an aircraft. Because each proximity sensor may be installed on one end of a moveable bridge, the specific location of each proximity sensor may vary depending upon the location of each aircraft at the stand. Although the following description is with reference to labelling images to identify and monitor objects of interest in the vicinity of an aircraft, this is exemplary, and embodiments of the invention find application in identifying and monitoring objects of interest near other transportation means or indeed near any point in space.

The one or more proximity sensors may be any suitable kind of sensor capable of detecting the presence of the proximity devices within range of the one or more proximity sensors. Illustrative examples of proximity sensor are WiFi™ sensors, Bluetooth sensors, Inductive sensors, weight sensors, optical sensors and radiofrequency identifiers.

The coverage of one or more proximity sensors is aligned with field of view of one or more monitoring sensors. In this way, the three-dimensional space corresponding to the coverage of the one or more proximity sensors is captured within or corresponds to the field of view of the one or more monitoring sensors.

For example, the range or coverage of the proximity sensors may be substantially circular. The field of view of a camera or one or more monitoring sensors is trained or directed on to the range or area of coverage of the proximity sensors.

The one or more proximity sensors generate proximity sensor data. In some embodiments, the proximity sensor data may comprise one or more entries. Each entry comprises a unique identifier such as an IP address or other device identifier that corresponds to a particular proximity device, and a timestamp indicating a time at which the unique identifier entered or departed the coverage of the proximity sensor.

device, and a timestamp indicating a time at which the unique identifier entered or departed the coverage of the proximity sensor.

When an object of interest enters the coverage of the one or more proximity sensors, the proximity device installed on the object of interest is automatically detected by the one or more proximity sensors.

Automatic detection may be performed as follows. Each proximity sensor such as wireless network interface controller (WNIC) has a unique ID (e.g. MAC address, IP) and can be connected to a wireless radio-based network using an antenna to communicate via microwave radiation. WNIC can operate in infrastructure mode to directly interface with all other wireless nodes on the same channel. A wireless access point (WAP) provides a SSID and wireless security (e.g. WEP or WPA). The SSID is broadcast by stations in beacon packets to announce the presence of a network. The wireless network interface controller (WNIC) and the wireless access point (WAP) must share the same keys or other authentication parameters.

The system provides a private hotspot (tethering) at each operation station. For example, 802.11n standards for example operates in the 2.4 GHz and 5 GHz bands. Most newer routers are able to utilise both wireless bands, known as dual band. This allows data communications to avoid the crowded 2.4 GHz band, which is also shared with Bluetooth devices. The 5 GHz band is also wider than the 2.4 GHz band, with more channels, which permits a greater number of devices to share the space.

The WiFi or Bluetooth access points or similarly a GPS sensor can provide the location data that can be used for training machine learning models. Optionally this data may be used in conjunction with the trained model to provide higher performance.

The one or more proximity sensors capture the unique identifier of the proximity device and the timestamp corresponding to the time at which the proximity device was detected.

When an object of interest exits the coverage of the one or more proximity sensors, the one or more proximity sensors detect the departure of the proximity device. The one or more proximity sensors capture the unique identifier of the proximity device and the timestamp corresponding to the time at which the departure of the proximity device was detected.

In other embodiments, the one or more proximity sensors capture proximity sensor data comprising one or more frames. Each frame of proximity sensor data may comprise a list of the proximity devices that are presently within the coverage of the one or more proximity sensors, and a timestamp indicating the time at which the frame of proximity sensor data was captured.

The system receives the monitoring sensor data from the one or more monitoring sensors, and the proximity sensor data from the one or more proximity sensors.

In some embodiments, the system stores the proximity sensor data comprising timestamps and unique identifiers in a Device IP Connected List. Each entry in the list comprises the unique identifier, the timestamp corresponding to the time at which the proximity device was detected or the departure of the proximity device was detected, the object name and one or more pre-processed videos associated with the object name.

The object name may be identified via a lookup table. The lookup table contains a list of unique identifiers and the name of the object of interest on which they are installed. The system queries the lookup table to determine the object name that is associated with the unique identifier of any particular proximity device. The object name may be added as an additional field in the relevant entry of the Device IP Connected List.

In some embodiments, the system processes the data stored in the Device IP Connected List to calculate one or more time intervals during which any particular object of interest was within the coverage of the one or more proximity sensors. The time interval may correspond to the time between the detected entry of a proximity device installed on an object of interest into the coverage of the one or more proximity sensors and the detected departure of the proximity device from the coverage of the one or more proximity sensors. Therefore, the calculated time interval represents a time during which the object of interest was present within the coverage of the one or more proximity sensors. The one or more calculated time intervals may be stored as an additional field to the relevant entry in the Device IP Connected List.

The system processes the monitoring sensor data from the one or more monitoring sensors to automatically annotate the monitoring sensor data. The system selects each frame of the monitoring sensor data, and reads the timestamp associated with the frame. The system then compares the timestamp with the one or more timestamps or time intervals of the proximity sensor data. The system determines whether the monitoring sensor timestamp matches a timestamp of the proximity sensor data, or falls within a calculated time interval of the proximity sensor data.

If the system determines that the timestamp of the selected frame falls within a time interval of the proximity sensor data, the system annotates the selected frame with the unique identifier associated with the time interval. Therefore, the system annotates the selected frame with the unique identifier of any proximity device that was within the coverage of the one or more proximity sensors at the time the selected frame was captured.

If the timestamp of the selected frame falls within a plurality of time intervals of the proximity sensor data, the system annotates the selected frame with the unique identifiers associated with each of the plurality of time intervals. Therefore, the system annotates the selected frame with the unique identifier of each proximity device that was within the coverage of the one or more proximity sensors at the time the selected frame was captured.

The process is repeated for each of the frames of monitoring sensor data, until all of the frames have been annotated with the one or more unique identifiers that represent the objects of interest that are present in each frame.

In some embodiments, the system may utilise one or more image processing techniques to assist in the annotation of the selected frames. The one or more image processing techniques may include segmentation algorithms, noise-reduction techniques, and other object-recognition techniques. The system may also apply Optical Character Recognition algorithms to the selected frames in order to recognise distinguishing textual marks on the one or more objects of interests. If people were not included in the objects-of-interest during the dataset generation phase, the system may utilise additional object recognition algorithms to annotate additional features of interest, such as people.

The system may utilise the annotations from previously-processed frames as prior information when annotating the selected frames.

According to some embodiments, the system may utilise positioning data from one or more positioning sensors installed on objects of interest. For example, certain objects of interest, such as vehicles, may include a pre-installed Global Positioning System (GPS) sensor. The data from the one or more positioning sensors may be used by the system to assist in the annotation of the selected frames of monitoring sensor data. For example, positioning data indicating a latitude and longitude corresponding to the field of view of the one or more monitoring sensors, at a certain time, may be used as a prior when annotating the selected frame corresponding to that time.

Training Phase

The annotated monitoring sensor data may be used to train a machine learning model. In preferred embodiments, the machine learning model may be a neural network classifier, such as a convolutional neural network. The trained neural network classifier may be configured to take as input a single frame of monitoring sensor data and provide as output a labelled frame of monitoring sensor data. For example, the neural network may take as input a single video frame from a CCTV camera (monitoring sensor) and output a labelled frame identifying one or more objects of interest in the frame.

In case of the camera, the monitoring sensor data contains the frames or sequential images from the camera sensor. In the case of LiDAR the data is point cloud, and in RGB-D or Time-of-Flight cameras, the data is a combination of images and point cloud.

The machine learning model may be trained by a machine learning training module. Machine learning model training will be well known to the skilled person, with various possible approaches. In one specific implementation, the machine learning model is a deep learning approach and is a convolutional neural network-based method. The implementation may be in Python using TensorFlow or PyTorch modules.

Accordingly, it will be appreciated that in order to train a machine learning model labelled data (e.g. image of vehicles in the field of view and their names) is needed. To obtain the names (label) sensors may be installed on vehicles (e.g. wireless interface card) and an access point where that data collection (e.g. camera) is installed. Once the vehicle is in the coverage of the access point, its wireless interface card detects the access point SSID and connects to it. We use the timestamp and the connected devices list of the access point to label images (or point clouds).

In the specific example of WiFi communications, the proximity sensor data is WiFi connectivity data. However, it will be appreciated that Bluetooth or GPS data could be used for the same purpose in addition to or instead of the WiFi connectivity data.

Thus, embodiments of the invention comprise a system which is able to learn. During the training process, the machine learning training module iteratively adjusts one or more parameters of the machine learning model to reduce a "cost function". The value of the cost function is representative of the performance of the machine learning model. For example, the cost function may depend on the accuracy with which the machine learning model predicts the one or more unique identifiers associated with a given frame of monitoring sensor data. One well known algorithm used for training neural network models is the backpropagation gradient descent algorithm. Gradient descent is an optimization algorithm for finding a local minimum of a function by taking steps proportional to the negative of the gradient of the function at the current point. For every input the backpropagation algorithm computes the gradient of the loss function with respect to the output and the weights of the network. Instead of direct computation of each weight individually and inefficiently, the backpropagation algorithm computes the gradient of the loss function with respect to each weight using a chain rule. The algorithm computes the gradient of one layer at a time and iterates backward from the last layer to avoid redundant calculations of intermediate terms in the chain rule. Using this method backpropagation makes it feasible to use gradient for multilayer networks such as Multi-Layer Perceptron (MLP).

Application of Trained Machine Learning Model

The trained machine learning model may be applied to unlabelled monitoring sensor data to automatically label any objects of interest present in any given frame of the monitoring sensor data. Once the machine learning model has been trained, there is no need for proximity sensors to be installed on the objects of interest, the trained machine learning model may receive the monitoring sensor data as input. In some embodiments, the trained machine learning model may not receive further proximity sensor data. The trained machine learning model may output labelled monitoring sensor data identifying one or more objects of interest present in one or more frames of the monitoring sensor data.

The system may be configured to perform live analysis of monitoring sensor data. A live feed of monitoring sensor data may be fed to the system to be used as input to the trained machine learning model. Thereby, the system may provide substantially real-time labelled monitoring sensor data.

In some embodiments, the performance of the trained machine learning model can be continuously improved during use. The machine learning model parameters may be fine-tuned using detected monitoring sensor data and/or other sensor data such as GPS sensor data.

The system may use the labelled data output from the machine learning model as part of an object tracking process. For example, the system may track the position of the one or more labelled objects of interest over one or more subsequent frames. In further embodiments, the system may use the calculated positions of one or more labelled objects of interest over time to predict the likely future position of the one or more labelled objects of interest. The system may use the predicted positions to determine impending collisions between one or more objects of interest.

The system may provide the tracking information for the one or more labelled objects of interests as an output. In some embodiments the system may use the tracking information to perform automatic guidance of the one or more objects of interest. If the system determines that a collision between one or more objects of interest is imminent, it may automatically take action to prevent the collision, for example by issuing a command to stop the movement of the one or more objects of interest.

Specific Embodiment in an Aviation Industry Context

Specific embodiments of the invention, as applied in the context of the aviation industry, will now be described with further reference to the accompanying drawings.

FIG. 1 shows a typical apron that may be found at any airfield or airport. Also referred to as the airport apron, flight line or ramp, the apron is the area of an airport where aircraft are parked between flights. Whilst parked on the apron, the aircraft may be loaded, unloaded, refueled, disembarked and boarded. Passengers and crew may embark/disembark from the aircraft via a jet bridge 105. The jet bridge 105 forms a bridge between the access doors of the aircraft and the passenger terminal. Alternatively, passengers may embark/disembark from the aircraft via other means, such as mobile steps or without requiring steps at all in the case of smaller aircraft.

Also shown in FIG. 1 are a number of vehicles 101 that are typically found on the apron at any airfield or airport. The vehicles 101 may include baggage transport, fuel tankers, passenger transport vehicles and other vehicles. Any of the vehicles may be present on the apron at any time whether or not an aircraft is parked on the apron. Further, one or more emergency vehicles 102 may be called to the apron to provide an emergency response.

To facilitate and keep track of the arrival and departure of aircraft and coordinate the numerous vehicles present on the apron at any given time, various monitoring sensors may be used.

FIG. 1 shows surveillance cameras 104 that are configured to continuously monitor the apron. The surveillance cameras 104 are preferably positioned such that the entire apron is within the field of view of the one or more cameras 104. The cameras 104 output video data comprising a number of frames. Each frame of video data comprises a still image captured by the sensor of the camera, and a timestamp indicating the time at which the frame was captured. Other types of monitoring sensor may be used in addition to or instead of the surveillance cameras 104. One alternative type of monitoring sensor is a Light Detection and Ranging (LiDAR) sensor. LiDAR sensors may output LiDAR data comprising a number of frames. Each frame of LiDAR data comprises a point cloud representing calculated range measurements distributed over the field of view, and a timestamp indicating the time at which the frame was captured. Another alternative type of monitoring sensor is a Time-of-Flight camera. A time of flight camera is a range imaging camera that resolves the distance between the sensor and the subject. Laser-based time-of-flight cameras capture distance measurements over the entire field of view with each pulse of a light (LASER) source. The skilled person would appreciate that the invention need not be limited to these particular types of monitoring sensor and that other types of monitoring sensor could equally be utilised.

Figure 2:
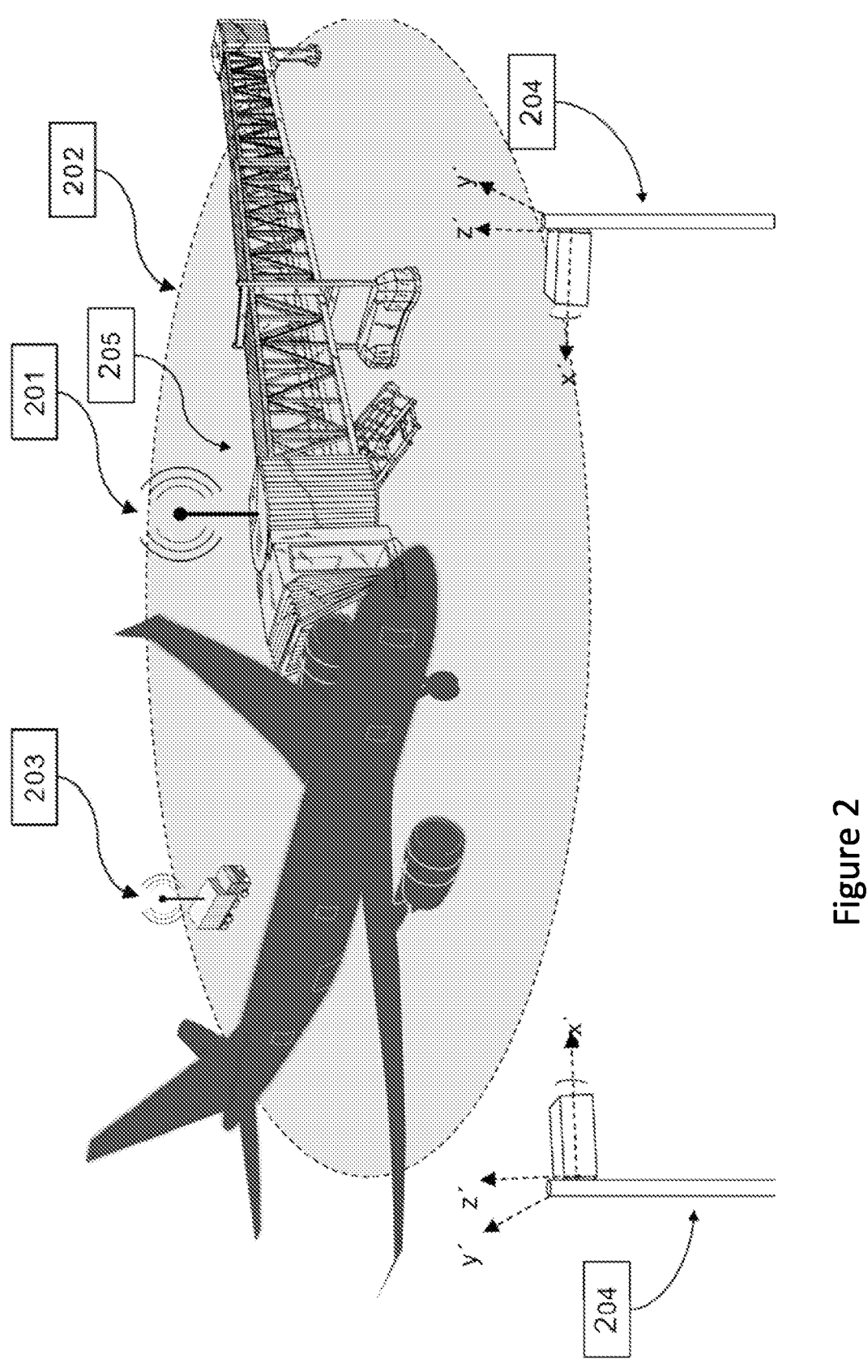
FIG. 2 illustrates the position of one or more proximity sensors, installed on the end of a jet bridge on the airport apron, and one or more proximity devices installed on one or more vehicles of interest.

During a dataset creation phase, one or more proximity sensors may be installed within the apron. FIG. 2 illustrates a proximity sensor 201 that may be located within the apron. In some embodiments, the proximity sensor may be a WiFi proximity sensor such as a WiFi or wireless communications router. WiFi routers will be known to the skilled person, and are inexpensive and widely available. The skilled person will nonetheless appreciate that the proximity sensor need not be limited to a WiFi router, and any suitable proximity sensor may be used.

The proximity sensor may in fact be any receiver which detects the presence of a transmitter which is within the detection range of the receiver.

The WiFi router 201 may be installed in a central location on the apron. The WiFi router 201 may be positioned such that the coverage of the WiFi router 201 extends so as to completely cover the apron. In the embodiment shown in FIG. 2, the WiFi router 201 is installed on the end of the jet bridge 205. In this case, the router 201 is installed at the end of the jet bridge closest to the aircraft. In some embodiments, a plurality of WiFi routers 201 may be installed within the apron, such that the combined coverage of the plurality of WiFi routers 201 extends so as to completely cover the apron. It will be appreciated that in certain embodiments, the coverage of the one or more WiFi routers 201 need not extend so as to cover the entire apron, but may only cover a portion of the apron. The coverage of the one or more WiFi routers 201 is aligned with the field of view of the one or more surveillance cameras. In some embodiments the one or more surveillance cameras are positioned such that the apron fills the field of view of the one or more surveillance cameras, and the one or more WiFi routers 201 are installed such that the coverage of the one or more WiFi routers 201 extends to cover the apron entirely. In other embodiments the one or more surveillance cameras may be positioned such that the apron is located within the field of view, and the one or more WiFi routers 201 may be positioned such that the coverage of the one or more WiFi routers 201 extends to cover at least the apron. The coverage of the one or more WiFi routers 201 and the field-of-view of the one or more surveillance cameras 204 are aligned such that objects present in the field-of-view of the one or more surveillance cameras are within the coverage of the one or more WiFi routers 201.

During the dataset creation phase, one or more proximity devices may be installed on one or more vehicles or pieces of equipment within the apron. FIG. 2 illustrates one such proximity device 203 installed on a vehicle which is present on the apron. The one or more proximity devices 203 are capable of being detected by the one or more proximity sensors 201. In embodiments wherein the one or more proximity sensors 201 are WiFi routers, the one or more proximity devices 203 may be WiFi enabled devices, such as mobile telephones, tablets, smart watches and other devices. Where the proximity sensors 201 are other types of sensor, the proximity devices 203 may be devices that are capable of being detected by the proximity sensors 201. The one or more proximity devices 203 are each associated with a unique identification number that is used to identify each proximity device 203. In embodiments of the invention where the one or more proximity devices 203 are WiFi enabled devices the unique identification number may be the IP address of the device. It will be appreciated that the proximity devices may be any suitable device that is capable of being detected by the one or more proximity sensors 201. The advantage provided by using a WiFi enabled device such as a mobile phone, is that they are relatively inexpensive and very readily available.

The unique identification number, and the vehicle or piece of equipment on which the associated proximity device 203 is installed may be recorded in a lookup table. The lookup table may comprise a list of the unique identification numbers corresponding to each of the one or more proximity sensors 201 and an indication of the vehicle or piece of equipment on which the proximity devices 203 are installed. In embodiments wherein the one or more proximity sensors are WiFi routers and the one or more proximity devices are WiFi enabled devices, the lookup table comprises a list of the IP addresses of the one or more WiFi enabled devices and indications of the vehicles or pieces of equipment on which each of the WiFi enabled devices are installed.

When a vehicle or piece of equipment with a WiFi enabled device 203 installed thereupon is within the coverage of the one or more WiFi routers 201, the one or more WiFi routers 201 detect the WiFi enabled device 203. In some embodiments, when the vehicle or piece of equipment and associated WiFi device 203 first enters the coverage of the one or more WiFi routers 201, the one or more WiFi routers 201 detect the WiFi device 203, and record the IP address of the WiFi device 203 and the timestamp corresponding to the time at which the WiFi device 203 entered the coverage of the one or more WiFi routers 201. Subsequently, while the WiFi device 203 remains within the coverage of the one or more WiFi routers 201, the one or more WiFi routers 201 continue to detect the WiFi device 203. When the vehicle or piece of equipment and associated WiFi device 203 leave the coverage of the one or more WiFi routers 201, the one or more WiFi routers 201 detect the departure of the WiFi device 203 and record the IP address and the timestamp corresponding to the time at which the departure of the WiFi device 203 was detected. The one or more WiFi routers 201 may then output proximity sensor data comprising a series of timestamps representing times at which any of the one or more WiFi enabled devices 203 enter or leave the coverage of the one or more WiFi routers 201, and the IP address associated with each of the detected WiFi enabled devices 203 that are detected.

Figure 3:
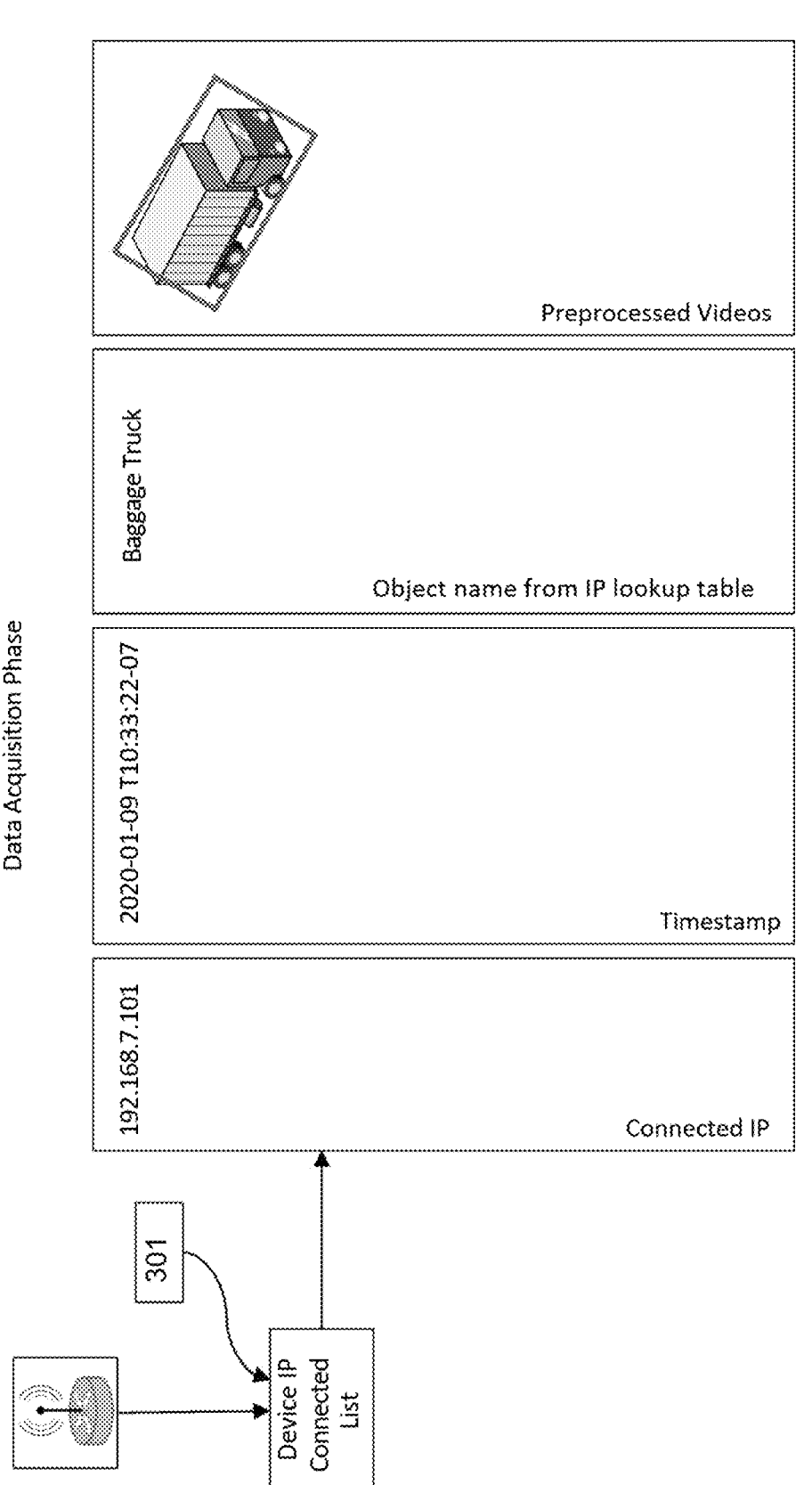
FIG. 3 shows an example of a device IP connected list.

The proximity sensor data—comprising a series of timestamps representing times at which any of the one or more WiFi enabled devices 203 enter or leave the coverage of the one or more WiFi routers 201, and the IP address associated with each of the detected WiFi enabled devices 203 that are detected—may be stored in a Device IP Connected List 301, as shown in FIG. 3. Each entry in the list comprises an IP address of a WiFi enabled device 203, a timestamp corresponding to the time at which the WiFi enabled device 203 was detected or the departure of the WiFi enabled device was detected, and the vehicle name or equipment name. Entries of the Device IP Connected List 301 may further comprise one or more pre-processed videos associated of the vehicle name or equipment name. In other embodiments, the vehicle name or equipment name associated with each IP address may be stored and accessed via a lookup table.

In other embodiments, the one or more WiFi routers 201 may continuously detect any WiFi enabled devices 203 present within the coverage of the one or more WiFi routers. The one or more WiFi routers 201 may output proximity sensor data comprising one or more frames. Each frame may comprise a list of IP addresses corresponding to any of the WiFi enabled devices that are detected within the coverage of the one or more WiFi routers 201, and a timestamp corresponding to the time at which the devices are detected.

Figure 4:
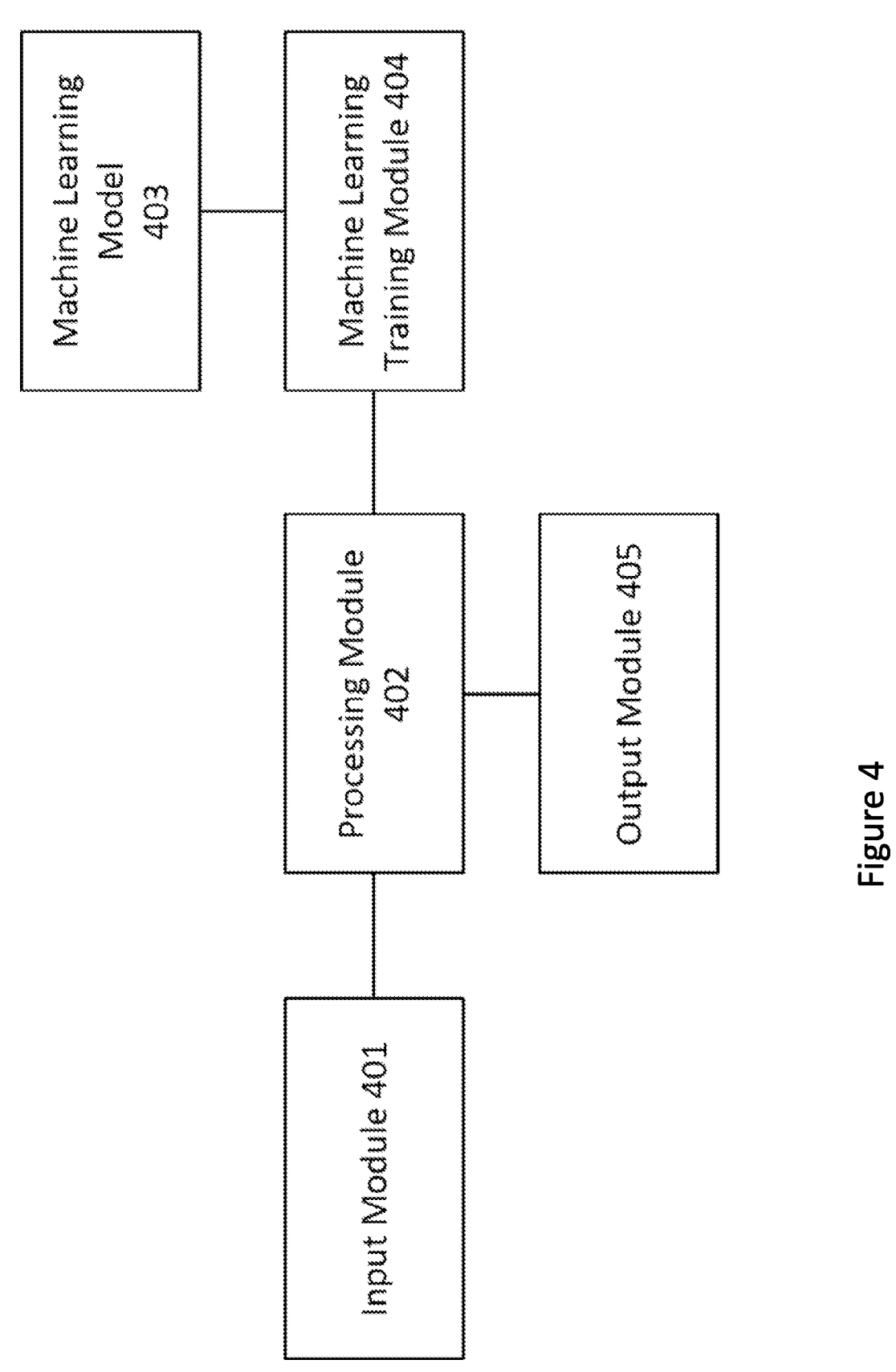
FIG. 4 is a schematic diagram showing different functional components of an embodiment of the invention.

FIG. 4 shows a schematic diagram of the system according to an embodiment of the present invention. The system comprises an input module 401, processing module 402, machine learning model 403, machine learning training module 404, and output module 405. The input module 401 is configured to receive the monitoring sensor data and proximity sensor data. According to the preferred embodiment described above, the input module 401 is configured to receive monitoring sensor data from the one or more CCTV cameras and proximity sensor data from the one or more WiFi routers 201. The input module 401 passes the monitoring sensor data and proximity sensor data to the processing module 402.

In some embodiments, the processing module processes the received proximity sensor data to calculate one or more time intervals during which each of the vehicles or pieces of equipment are present within the coverage of the one or more WiFi routers 201. In embodiments wherein the proximity sensor data comprises one or more timestamps representing times when any of the one or more WiFi enabled devices 203 enter or leave the coverage of the one or more WiFi routers 201, the processing module 402 may process the proximity sensor data to generate one or more frames of proximity sensor data, each frame with an associated timestamp and a list of the unique identifiers of any WiFi enabled devices 203 present within the range of the one or more WiFi routers at a time corresponding to the timestamp. The time interval between consecutive generated frames of proximity sensor data is preferably equal to the time interval between consecutive frames of monitoring sensor data. In some embodiments, the processing module processes the proximity sensor data to generate one or more frames of proximity sensor data, with timestamps that match the timestamps associated with one or more frames of the received monitoring sensor data.

Figure 5:
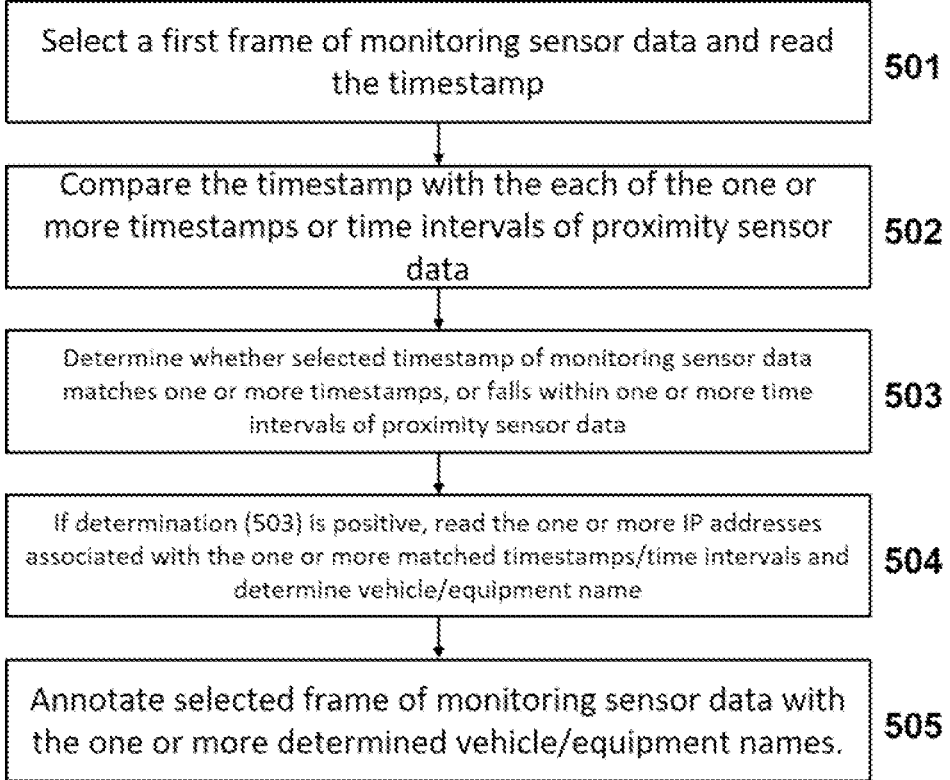
FIG. 5 is a flow diagram showing the different steps of a method of annotating monitoring sensor data according to an embodiment of the invention.

The processing module 402 processes the monitoring sensor data to create the training dataset. FIG. 5 illustrates a method of automatically annotating the monitoring sensor data that is performed by the processing module 402 to create a labelled training dataset.

Firstly, at step 501, the processing module 402 selects the first frame of the received monitoring sensor data, and reads the timestamp associated with the selected frame. Second, at 502, the processing module 402 compares the timestamp associated with the selected frame with the one or more timestamps or time intervals of the proximity sensor data. At 503, the processing 402 module determines whether the selected timestamp of monitoring sensor data matches one or more timestamps, or falls within one or more time intervals, of the proximity sensor data. At 504, if the determination is positive, the processing module 402 reads the one or more IP addresses associated with the one or more timestamps or time intervals of proximity sensor data. The processing module 402 then determines, for example via lookup table or Device IP Connected List, the vehicle or equipment name associated with each of the one or more IP addresses. At 505, the processing module 402 annotates the selected frame of monitoring sensor data with the one or more device names.

The processing module 402 then repeats the steps 501 to 505 for each of the frames of the monitoring sensor data. Thereby, each frame of monitoring sensor data is annotated with name or names of any vehicle or objects of interest that are present in the field of view of the one or more surveillance cameras 104 during that frame.

The processing module 402 may utilise one or more further models, such as computer-vision, image processing, and machine learning methods, to assist in the annotation of the frames of monitoring sensor data. For example, the processing module may apply segmentation algorithms, noise-reduction algorithms, edge-detection filters and other object-recognition techniques to the selected frame of monitoring sensor data to assist in annotating the monitoring sensor data. In some embodiments, the processing module 402 may use previously-annotated frames as prior information when annotating the presently-selected frame. In some embodiments, the further models may be utilised to generate embedded feature vectors, wherein each embedded feature vector is associated with an object of interest annotated in one or more frames of the monitoring sensor data. The embedded feature vector may include further characterising information related to the object of interest with which it is associated. For example, one or more further models may be used to extract the colour, model, make, and license plate ID of a vehicle present in a frame of monitoring sensor data.

The annotations of the monitoring sensor data may include one or more identifying images associate with the each of the identified objects of interest. For example, the annotation of an image of a vehicle identified within a frame of monitoring sensor data may include a number of images showing said vehicle from different angles and/or in different lighting conditions. The identifying images may be stored in a local memory of the system and used to improve and/or augment the identification of objects of interest in unlabelled monitoring sensor data.

In some embodiments, the processing module 402 is configured to utilise Optical Character Recognition algorithms to detect distinguishing textual marks, such as tail-fin numbers or vehicle registration plates to identify vehicles or objects of interest. In some embodiments the input module 401 is further configured to receive positioning data from one or more positioning sensors installed on vehicles or pieces of equipment. Specifically, positioning sensors may comprise GPS sensors or other suitable positioning sensors. The input module 401 passes positioning data to the processing module 402 to assist in the annotation of monitoring sensor data. These methods may be applied during the initial dataset creation phase, or during the application phase as a method of continuously improving the system performance by providing additional labelled monitoring sensor data.

The machine learning training module 404 receives the annotated monitoring sensor data and uses it to train the machine learning model 403. In preferred embodiments, the machine learning model 403 is a neural network classifier model, even more preferably a deep neural network classifier. The machine learning model 403 takes a frame of monitoring sensor data as input, and outputs an annotated frame with annotations indicating the one or more vehicles or pieces of equipment that the machine learning model predicts are present within that frame. In preferred embodiments, the machine learning model 403 outputs an annotated frame indicating the predicted position of one or more vehicles or pieces of equipment within the frame. In other embodiments, the annotated frame may comprise one or more annotations, indicating one or more vehicles or pieces of equipment that the model 403 predicts are present at some position within the frame, wherein the annotations may be stored as meta-data with the frame.

During the training process, which will be well known to the skilled person, the machine learning training module 404 adjusts the weights and biases of the neural network model to reduce the value of a cost function. The value of the cost function is calculated based on the accuracy of the predicted vehicles or equipment present within a given frame of the annotated monitoring sensor dataset. The weights and biases are updated in such a way as to increase the accuracy of the prediction. The machine learning training module 404 uses the backpropagation gradient descent algorithm for calculating the changes required to the weights and biases and updating the network.

Figure 6:
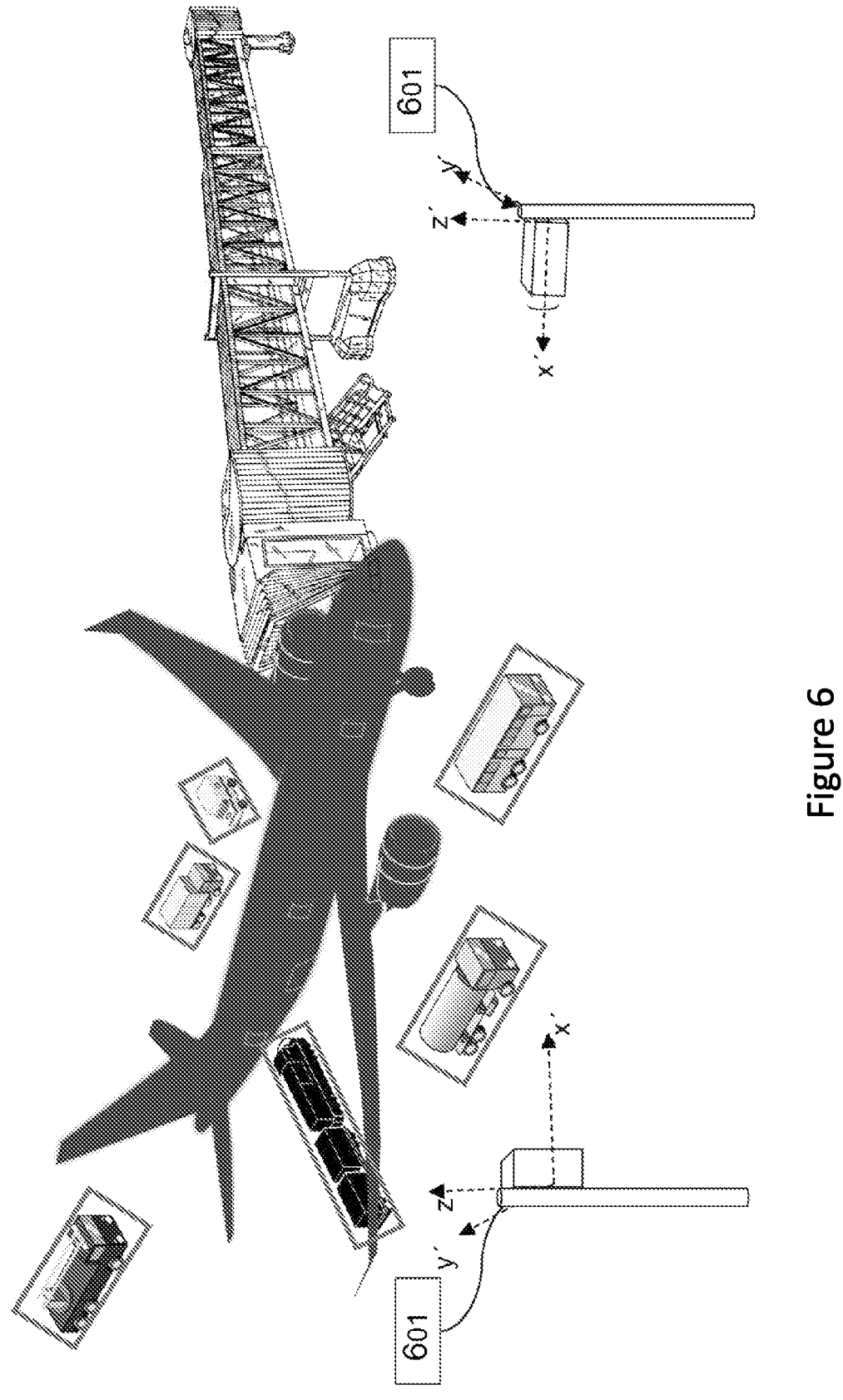
FIG. 6 illustrates annotated monitoring sensor data that is output by the trained machine learning mode of the present invention.

Once the machine learning model 403 has been trained on the labelled monitoring sensor data, the trained machine learning model 403 is applied on unlabelled monitoring sensor data to automatically label any vehicles or equipment present in received frames of monitoring sensor data. The input module 401 receives unlabelled monitoring sensor data from the one or more surveillance cameras or LiDAR sensors 104. The unlabelled monitoring sensor data is input to the machine learning model 403. The machine learning model 403 outputs annotated monitoring sensor data. FIG. 6 illustrates the annotated monitoring sensor data that is output by the trained machine learning model 403. The one or more surveillance cameras or other monitoring sensors 601 capture monitoring sensor data, which is then labelled by the machine learning model to detect the vehicles present on the airport apron.

Figure 7:
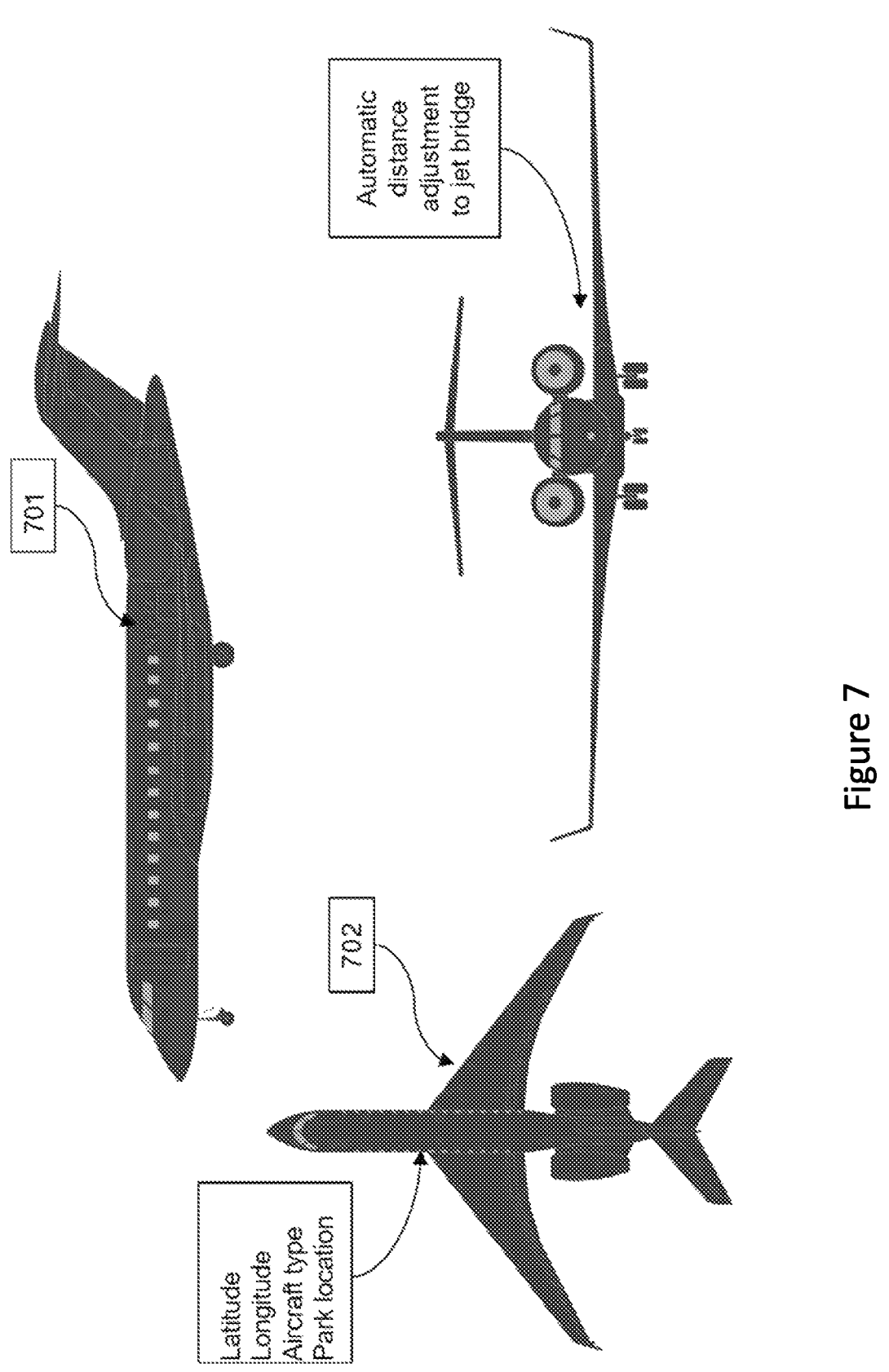
FIG. 7 illustrates some examples of applications of the system for improving tracking of aircraft.

FIG. 7 illustrates some examples of applications of the system for improving tracking of aircraft.

To detect an aircraft 702, its type, and the unique ID of it, embodiments of the invention may use three sources of data (or a combination of data sources) and combines them to accurately identify the aircraft:

1—the schedule data of aircrafts
    2—an OCR to read the tail number 701
    3—aircraft type detection machine learning Knowing the aircraft type, position and its schedule a machine learning model can optimize services. In addition, while the landed aircraft radar is off (e.g., during the night) the exact position of each aircraft can be identified (for example in a digital twin). Fulling, defrosting, baggage loading, or other services can be optimized using an AI based schedule that globally optimizes all processes. The optimal operations can be used to train machine learning models to learn best decisions and propose them to the operators. Once the accuracy and robustness of models are tested, then machine learning models can provide optimal decisions to ground handler and pilots, and an expert operator may just monitor and verify the optimised operations to double check to make sure there is no conflict or anomalies.

According to the illustrative embodiment, the system may utilise multiple sources of data for tracking aircraft in an airport setting. The system receives, via the input module 401, schedule data relating to the airport. The schedule data comprises the expected arrival and departure times of one or more aircraft, the assigned gate numbers, and aircraft information such as tail fin number and aircraft type. The system identifies an aircraft within the field of view of the one or more monitoring sensors. The system may use Optical Character Recognition (OCR) to read the tail fin number of the aircraft. In other embodiments, the system may use the machine learning model 403, and/or other position data from the aircraft such as GPS data and radiofrequency identification. The machine learning model may be trained to recognise different aircraft types using labelled training data as described previously. It will be appreciated that the system may utilise any combination of one or more of the inputs above, and may utilise other sources of data in addition to those described above in the illustrative embodiment. Upon identifying the aircraft within the field of view of the one or more monitoring sensors, the system uses the identified aircraft type, position and schedule information to optimise aircraft services. Aircraft services that may be optimised using the improved aircraft tracking of the present invention include fueling, defrosting, baggage loading, re-stocking and aircraft maintenance. In some embodiments, the improved aircraft tracking is provided to a human operator who optimises one or more aircraft services based on the tracking information. In other embodiments, the system may train a machine learning model using the optimised aircraft services. The machine learning model may thereby learn how to optimise the one or more aircraft services based on the aircraft tracking information. In some embodiments, an expert human operator monitors the decision making process of the trained machine learning model to ensure there are no errors or anomalies. In other embodiments, the system provides optimised aircraft services based on the improved aircraft tracking autonomously without human supervision or input.

Figure 8:
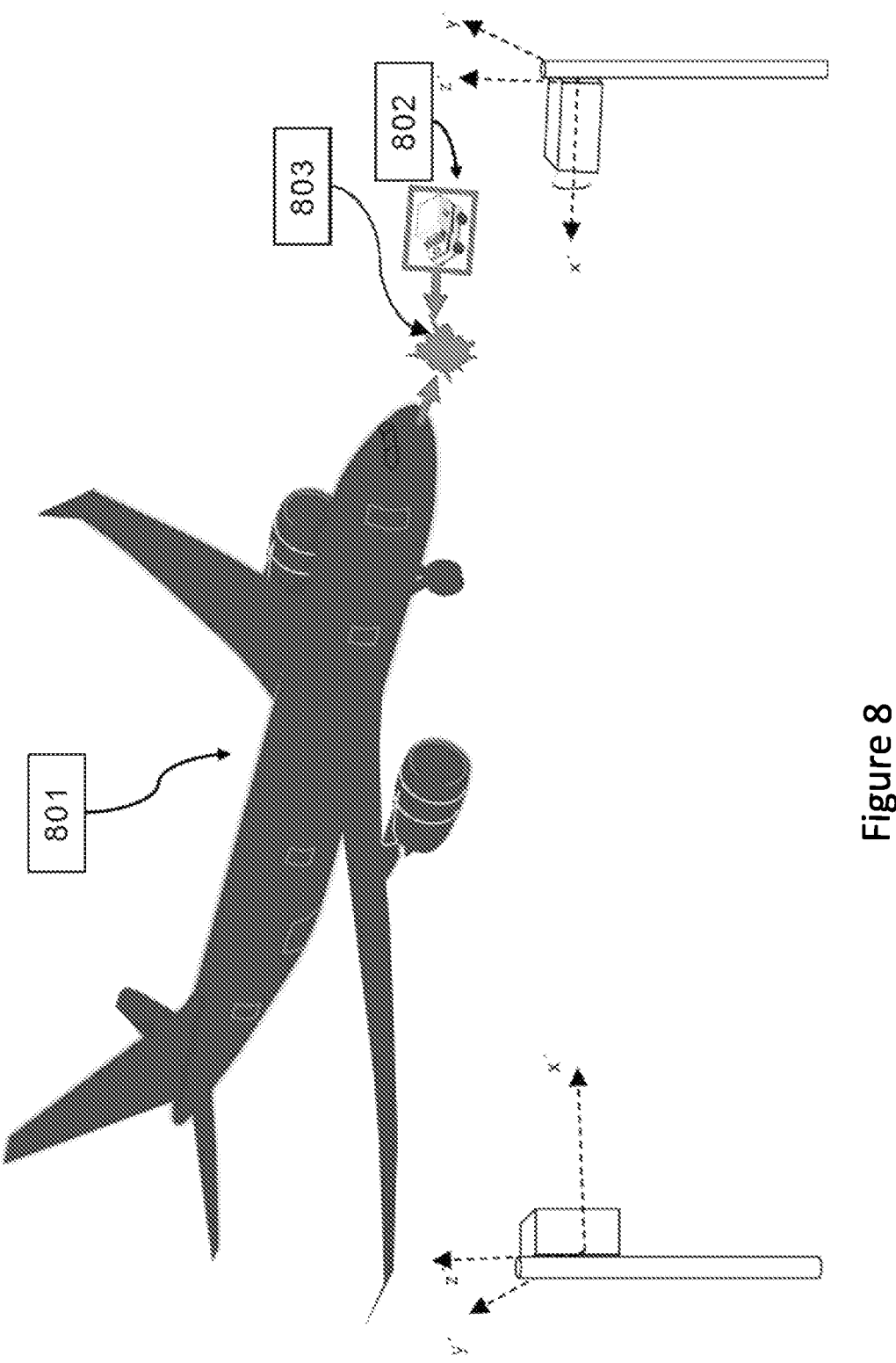
FIG. 8 illustrates an automated collision-detection method according to an embodiment of the invention.

FIG. 8 illustrates an automated collision-detection method that may be implemented using the system of the present invention. According to the illustrative embodiment shown, the system identifies two vehicles within the field of view of the one or more monitoring sensors—a passenger aircraft 801 and an emergency vehicle 802. The machine learning model 403 outputs labelled monitoring sensor data indicating the position of the vehicles within the field of view of the one or more monitoring sensors. In some embodiments, the system utilises additional positional information from position sensors installed on the vehicles, such as GPS sensors. The processing module 402 stores the position of each vehicle over a plurality of timeframes, and uses the time-variant position of each vehicle to calculate a predicted trajectory over time for each vehicle. The processing module 402 performs a check as to whether the predicted trajectories of the two vehicles intersect at a given future time point, indicating a likely collision between the two vehicles. If a likely collision 803 is detected, the processing module outputs a collision detection warning to the output module 405. The output module 405 outputs the collision detection warning via any suitable communications protocol. For example, in some embodiments the output module outputs the collision detection warning via radiofrequency communication to the two vehicles, warning the drivers of the detected likely collision 803. In other embodiments, the collision detection warning may be output to a self-driving vehicle system, as an instruction to take avoiding action to prevent the collision.

Figure 9:
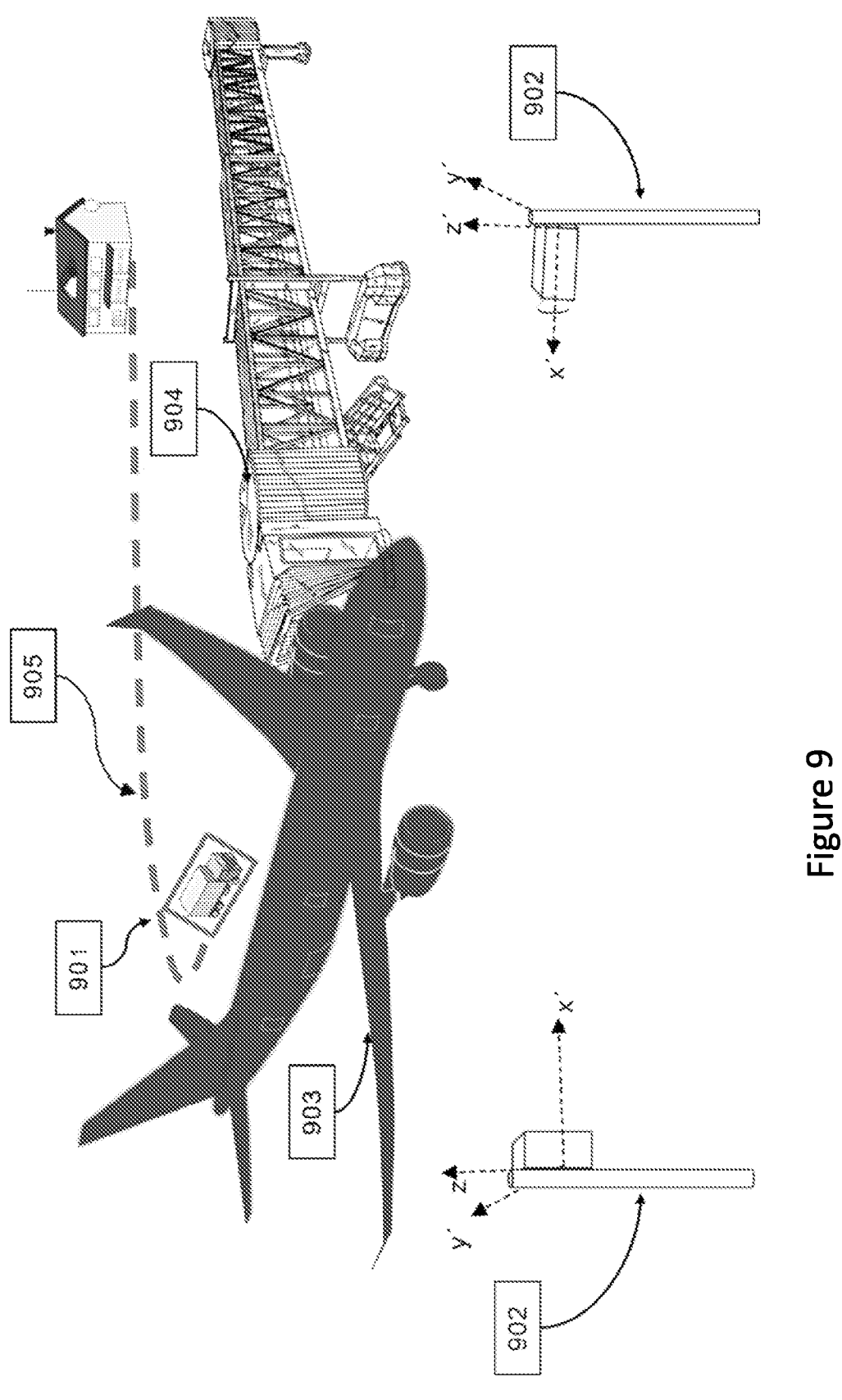
FIG. 9 illustrates a method for providing autonomous service vehicles according to an embodiment of the invention.
Figure 10:
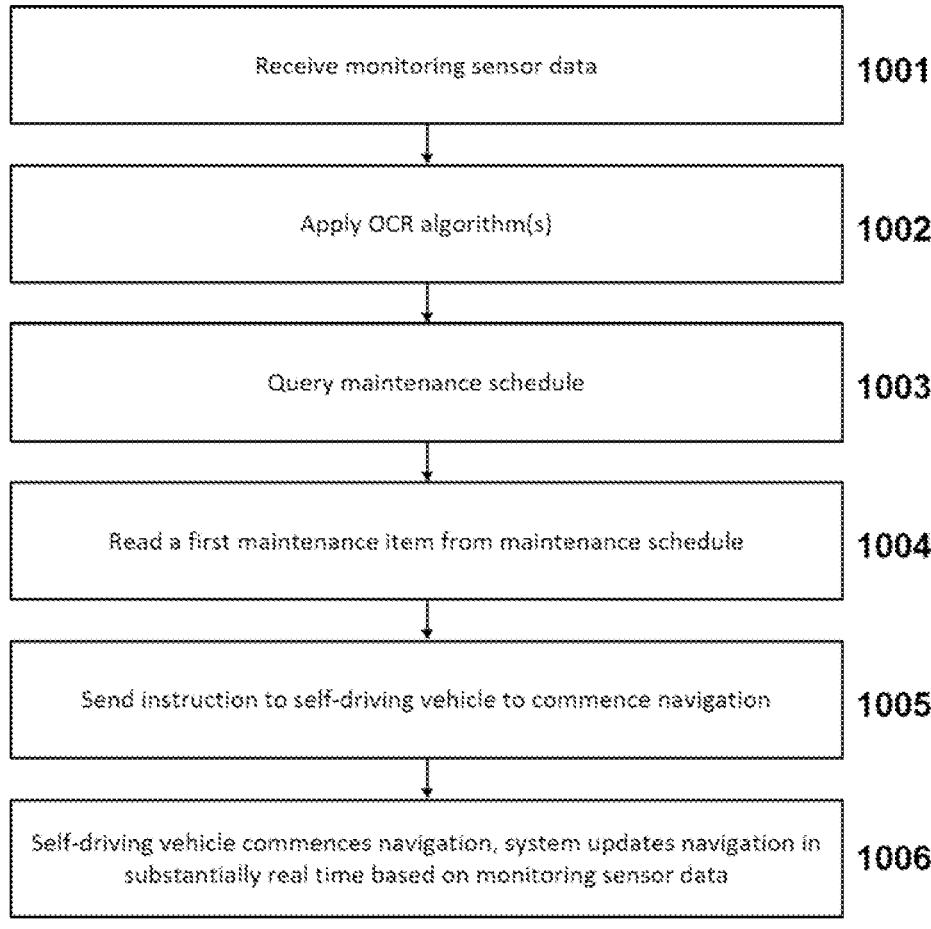
FIG. 10 shows a flow diagram of a method for providing autonomous service vehicles according to an embodiment of the invention.

FIGS. 9 and 10 illustrates a method for utilising the present invention for providing autonomous service vehicles. FIG. 9 shows a self-driving service vehicle 901. In certain embodiments, a number of collision detection sensors such as ultrasound range sensors may be installed on the self-driving service vehicle 901. In addition, the self-driving service vehicle 901 may have monitoring sensors such as cameras and LiDAR systems installed.

At step 1001, the one or more monitoring sensors 902 receive monitoring sensor data of an aircraft 903 situated on an apron. For example, an aircraft that has arrived and parked at the end of the jet bridge 904. The input module 401 receives the monitoring sensor data and passes it to the processing module 402. At step 1002 the processing module 402 applies OCR algorithms to the received monitoring sensor data to recognise the tail number of the aircraft 903. In other embodiments, the input module 401 may receive the tail number or a flight identification number of an aircraft located on the apron from an external source. At step 1003, upon recognising the tail number of the aircraft, the communication module may query an external source to send the maintenance schedule for the aircraft. In other embodiments, the maintenance schedule may be received by the input module 401 from an external source.

At step 1004, the processing module reads a first maintenance item from the maintenance schedule. For example, the maintenance item may be for refilling of food items or perishable supplies for the next scheduled flight of the aircraft. Based on this, the processing module determines that self-driving service vehicle 901 should navigate to the aircraft to deliver the required supplies. At step 1005, the processing module 402 sends an instruction via communication module 405 to self-driving vehicle 901 to commence navigation to the aircraft.

At 1006, the self-driving vehicle 901 commences navigation to the aircraft. The one or more monitoring sensors capture the self-driving vehicle 901 within the field of view and output monitoring sensor data to the input module 401 in substantially real-time. The machine learning model 403 analyses the monitoring sensor data and outputs labelled monitoring sensor data indicating the position of the self-driving vehicle 901. Based on the detected position of self-driving vehicle 901, the processing module 402 determines navigation instructions 905 that should be sent to the vehicle 901 to assist in navigating to the aircraft. The system repeats the process for all scheduled maintenance items on the maintenance schedule.

It will be appreciated that the present invention need not be limited to applications within the air transport industry, but has applications in other industries such as shipping and other public transport modalities, workshop equipment management, package tracking, and traffic management.

Application to Marine Vessel Tracking

One such alternative application of the present invention is within the shipping industry, in particular to the automated tracking of boats within a harbour or marina.

Labelled training datasets for use in training machine learning models may be generated in accordance with the present invention as set out above. In particular, monitoring sensor data of one or more objects of interests, including marine vessels such as boats and ships, is collected using one or more monitoring sensors installed to monitor an area of interest. An area of interest in a marine vessel tracking context may be a marina, or harbour for example, though other areas of interest are contemplated. The monitoring sensors may include, for example, CCTV cameras, video cameras attached to one or more drones, including alternative types of video camera such as LiDAR sensors, thermal imaging cameras etc.

Simultaneously, proximity sensor data may be collected of the one or more objects of interest via one or more proximity sensors installed in the area of interest, and one or more proximity devices installed on the one or more objects of interest.

The proximity sensor data and monitoring sensor data are used to automatically generate labelled monitoring sensor data wherein each frame is annotated to show any images of objects of interest present in the frame.

As set out above, the system may utilise position data from one or more positioning sensors. For example, marine vessels may utilise GPS systems, Differential GPS systems, RADAR systems, Global Navigation Satellite Systems, and/ or hydro acoustic transponder systems. This is not an exhaustive list of positioning systems used for marine vessels, and other suitable positioning systems could equally be used. The system may use the position data to augment the labelled training data for using during the training phase.

The system may further utilise additional image processing techniques to assist in the annotation of the monitoring sensor data. These techniques may include object tracking and extraction, pattern matching, person and face detection, object recognition, posture recognition, and the like. As described above, the system may utilise object recognition algorithms to identify and annotate images of people present in selected frames of monitoring sensor data.

In preferred embodiments, one or more further models, such as computer-vision, data-mining, and machine learning methods, may be utilised to assist in the annotation of frames of monitoring sensor data. In some embodiments, the one or more further models may be utilised to generate embedded feature vectors associated with the one or more identified objects of interest present in the monitoring sensor data. Such models are known to the skilled person. The embedded feature vectors may include further characterising information associated with the identified object of interest. For example, the one or more further models may be used to extract one or more of: the colour, model, make, ID number, registered owner, assigned location and itinerary information of a marine vessel present in a frame of monitoring sensor data. The feature vector may include position data related to the object of interest captured from one or more position sensors as described above.

The embedded feature vectors may be embedded within the annotated monitoring sensor data prior to training the first machine learning model. Alternatively or additionally, the second machine learning model may be used on-line, to generate embedded feature vectors associated with objects of interest annotated by the first machine learning model in live, or substantially live, monitoring sensor data.

The annotated monitoring sensor data is used to train a machine learning model in accordance with the invention as described above. The machine learning model may be utilise a deep learning approach and may be a neural network classifier implemented as a convolutional neural network. The machine learning model may be trained on the annotated data by a machine learning training module. The machine learning model may be configured to take as input a single frame of un-annotated monitoring sensor data, and output an annotated frame of monitoring sensor data which is annotated to reflect the location of any objects of interests present in the frame of monitoring sensor data. As described, in some embodiments the annotated frames output by the first machine learning model may also include the embedded feature vectors provided by the one or more further models. Once the machine learning model has been trained, the system including the trained machine learning model is applied on unlabelled monitoring sensor data to automatically annotate any marine vessels, equipment, or people present in received frames of monitoring sensor data.

An example application of the system in a marine vessel tracking context, is alerting the registered owner(s) if their vessel exits its assigned location. In this example, the system receives monitoring sensor data from one or more CCTV cameras positioned to monitor a marina or harbour. The system processes the monitoring sensor data and identifies one or more vessels present in the monitoring sensor data. For each of the one or more identified vessels, the system may perform further identification processes to generate an embedded feature vector associated with each of the identified vessels. The embedded feature vector may include one or more of the colour, make, model, registered owner, assigned mooring location, itinerary information, and other identifying characteristics. For example, the system may use optical character recognition (OCR) to identify the name or ID of the vessel, and include this information in the embedded feature vector. The system may receive identifying information including expected arrival and departure times, assigned mooring locations, registered owners etc. from an external source such as one or more servers of a marina booking system.

The system may determine that an identified marine vessel has departed from its assigned mooring location by tracking the position of the vessel in the monitoring sensor data, or by monitoring position data received from one or more position sensors of the vessel. The system may determine that the departure from the assigned mooring location is anomalous based on a comparison between the detected time-of-departure of the vessel and the expected time of departure based on itinerary information associated with the vessel. In response to the determination that the departure is an anomalous departure, the system may alert the registered owner(s) of the anomalous departure via generation of an electronic notification, SMS message, alarm notification, or such like.

Additional applications of the system in a marine vessel tracking context include anomaly detection, fire detection, and theft detection.

Usually, when an object of interest enters the coverage of the one or more proximity sensors, the proximity device installed on the object of interest is detected by the one or more proximity sensors. An entry timestamp corresponding to the time at which the object of interest enters the coverage or range of the one or more proximity sensor is generated.

Further, when an object of interest exits the coverage of the one or more proximity sensors, the one or more proximity sensors detect the departure of the proximity device.

The one or more proximity sensors capture the unique identifier of the proximity device and the timestamp corresponding to the time at which the departure of the proximity device was detected. An exit timestamp corresponding to the time at which the object of interest exits the coverage or range of the one or more proximity sensor is generated.

The entry and exit time stamps define a period of time during which objects of interest, which are within the field of view of the monitoring sensor, are labelled. In some embodiments, the labelling operation is performed for a period of about 10 minutes to 1 hour. This is a typical time period during which objects of interest are located within the field of view of the monitoring sensor and hence the range of the proximity sensor.

Of course, multiple objects of interest may typically be present within the coverage or range of the one or proximity sensors. Typically, each object of interest has an associated entry time stamp and an associated exit time stamp. Usually, the entry or exit time stamp associated with each object of interest is different, because objects of interest typically enter or exit the range of the one or more proximity sensors at different times. However, it will be appreciated that under certain circumstances, a plurality of objects of interest may enter the coverage or range of the one or more proximity sensors as substantially the same time. Thus, different entry and exit time stamps may be generated for each object of interest.

In one specific application directed to labelling images to identify and monitor objects of interest near a large object, the proximity sensor 201 has a range of up to approximately 100 m. This means that specific objects of interest can be identified and labelled anywhere in the proximity of a large aircraft or other object of interest. In some applications, the range of the proximity sensor can be greater. For example embodiments of the invention find application in labelling images to identify and monitor objects of interest near transportation means such as road vehicles, boats, cruise vessels, and aircraft carriers and so on. In such, and other applications the proximity sensor may have a range of up to 300 m to 400 m. Long range Wi-Fi may be used in some embodiments.

In one specific example the proximity sensor may comprise a software or hardware module which is configured to adjust the range of the proximity sensor in response to a range adjust command.

Embodiments of the invention may detect the size of an object, such as a transportation means, which near the proximity sensor.

In one specific example, this may be performed by using known image processing techniques to detect and read a unique identifier, such as a tail number (for example JA8089) or boat registration number. A lookup table of unique identifiers and corresponding aircraft types or/and sizes may be used. Embodiments of the invention may determine the unique identifier and using the lookup table, determine the size of the object, such as an transportation means, which the proximity sensor is close to.

Usually, the hardware or software module which is configured to adjust the range of the proximity sensor receives a command to adjust its range depending upon the size of the object, such as an aircraft, which is positioned close to the proximity sensor.

Rather than using a lookup table, the size of the aircraft or stationary object which is positioned close to the proximity sensor may be determined using LIDAR or based on features of aircraft.

Advantageously, some embodiments determine a period of time between the entry time stamp and the exit time stamp for each object which enters the coverage of the proximity sensor.

This allows for certain objects which are within the coverage of the proximity sensor for a short period of time to be not considered, or not processed algorithm which detects objects or labels each image to identify and monitor objects of interest.

For example, a threshold may be defined in which an object is not processed if it is within the range of the proximity sensor for say of 5 seconds. Other periods such as 10 minutes may also be advantageously used. This allows the system to not process or ignore different objects which enter the range of the proximity sensor for a short period of time.

With reference to the predetermined area 202 shown in FIG. 2 of the drawings, this area (and hence the range of the proximity sensor 201) is usually substantially circular.

However, certain sub sectors which are wholly contained within the predetermined area may be excluded from processing by the detection algorithm or algorithm which labels as each image to identify and monitor objects of interest.

This may be achieved by placing two or more additional proximity sensors (in addition to the proximity sensor 201) or Wi-Fi routers at different positions within the area 202. Known triangulation techniques may be used to define one or more sub sectors within the area which are not of interest. Any shape of the sub sectors may be defined. For example, a square sub sector may be defined with 4 longitude and latitude coordinates. Alternatively a circular sub sector may be defined with a single longitude coordinate and a single latitude coordinate, and a radius or diameter of the circular sub sector.

In some embodiments, the system or method may be configured to uniquely objects of interest and may differentiate between multiple objects of the same type within range of the proximity sensor or sensors. For example, suppose two there are two baggage vehicles servicing an aircraft. Each baggage vehicle may be assigned a different label. For example a first baggage truck may be assigned a label "Baggage_truck_1" and a second baggage truck may be assigned a label "Baggage_truck_2". This allows performance of the different baggage truck to be analysed. It also allows for specific faults of each object of interest to be determined. For example, a problem may be identified based on the average speed of the object or vehicle servicing an aircraft or other point in space. Each of these vehicles or objects may be uniquely identified, tracked, labelled and so on.

In an alternative application of embodiments of the invention which identify, monitor, track and label objects or usually vessels arriving or departing from a harbour. A vessels may have a unique feature such as a specific size and colour of sail.

Embodiments of the invention usually process a large number of image data or frames of a video feed over a predetermined period of time. This may be in the order of 10 to 20 minutes as explained above.

It is noted that in the present invention, the same video feed or image feed from each camera 204 shown in FIG. 2 is used for both the training phase according to embodiments of the invention and the labelling phase according to embodiments of the invention. This provides a superior of labelling images to identify and monitor objects of interest because the training environment is exactly the same as the deployment environment.

Embodiments of the invention determine whether an object is within a predetermined area 202 aligned with a first sensor.

Accordingly it will be appreciated that embodiments of the invention usually comprise a long-range proximity sensor which has a range greater than 0.5 m. The range of the proximity sensor is greater than the range of an optical scanner system by virtue of the use of using a wireless network protocol such as 802.11. Embodiments of the invention may operate in a frequency range of 2.4 GHz to 6 GHz.

Usually the proximity sensor range and CCTV field of view are aligned or substantially aligned.

In some embodiments of the invention an initial detection of objects of interest performed before performing auto labelling. For example, embodiments of the invention may detect an object in a frame, and then use method described above to assign label based on proximity data. It will be appreciated that some objects of interest, such as a baggage vehicle may already be fitted with the above described proximity device. However, objects may be retrofitted with a proximity device by installing proximity device on or within one or more objects of interest.

From the foregoing, it will be appreciated that embodiments of the invention advantageously:

identify relatively large objects (e.g., airfield vehicles, indoor robots) for training a machine learning model. Embodiments of the invention use long-range sensors (order of ~10s of meters) for data collection. In contrast, barcode laser scanners have significantly shorter range (order of ~10s of centimetres)

be configured to run continuously, day and night, without disruption, to collect data in all types of outdoor environmental conditions accurately label images for training a machine learning model. This may be achieved by detecting when an object appears on the camera view and when that object exits the view.

accurately determines the time a proximity sensor enters a reader's coverage. This may be achieved by aligning and calibrating the camera view (or camera's region of interest) to the sensor detectability coverage area, and the timestamp of when the object exits the view.

Further, embodiments of the invention have the advantages that they:

use long rage of detection which enables a large variety of applications such as cargo and parcel shipping industries, maritime and rail transport, vehicle detection, etc. to be able to label images for training machine learning models in real-world environments.

do not add any manual scanning processes. This makes embodiments of the invention for industries and operations that cannot tolerate disruption generates two timestamps (beginning and end timestamps of object in the view).

Manual scanning introduces noise and machine learning models disadvantageously learn these features as the target object as the person would be observed in all labelled images which confuses the machine learning model. Further, manual scanning is not technically possible for detection of large objects because manual scanning has a very short range.

From the foregoing, it will be appreciated that the system may comprise a computer processor running one or more server processes for communicating with client devices. The server processes comprise computer readable program instructions for carrying out the operations of the present invention. The computer readable program instructions may be or source code or object code written in or in any combination of suitable programming languages including procedural programming languages such as C, object orientated programming languages such as C#, C++, Java, scripting languages, assembly languages, machine code instructions, instruction-set-architecture (ISA) instructions, and state-setting data.

The wired or wireless communication networks described above may be public, private, wired or wireless network. The communications network may include one or more of a local area network (LAN), a wide area network (WAN), the Internet, a mobile telephony communication system, or a satellite communication system. The communications network may comprise any suitable infrastructure, including copper cables, optical cables or fibres, routers, firewalls, switches, gateway computers and edge servers.

The system described above may comprise a Graphical User Interface. Embodiments of the invention may include an on-screen graphical user interface. The user interface may be provided, for example, in the form of a widget embedded in a web site, as an application for a device, or on a dedicated landing web page. Computer readable program instructions for implementing the graphical user interface may be downloaded to the client device from a computer readable storage medium via a network, for example, the Internet, a local area network (LAN), a wide area network (WAN) and/or a wireless network. The instructions may be stored in a computer readable storage medium within the client device.

As will be appreciated by one of skill in the art, the invention described herein may be embodied in whole or in part as a method, a system, or a computer program product including computer readable instructions. Accordingly, the invention may take the form of an entirely hardware embodiment or an embodiment combining software, hardware and any other suitable approach or apparatus.

The computer readable program instructions may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

Exemplary embodiments of the invention may be implemented as a circuit board which may include a CPU, a bus, RAM, flash memory, one or more ports for operation of connected I/O apparatus such as printers, display, keypads, sensors and cameras, ROM, a communications sub-system such as a modem, and communications media.

In addition, the above detailed description of embodiments of the invention are not intended to be exhaustive or to limit the invention to the precise form disclosed. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure.

Embodiments of the invention may be described by the following numbered clauses.

1. A system for generating a labelled dataset, the system comprising:
  processing means configured to:
    receive monitoring sensor data comprising one or more frames wherein the image data comprises data defining an object of interest;
    receive proximity sensor data;
    analyse the one or more frames of monitoring sensor data to identify, based on the proximity sensor data, one or more objects of interest present in the one or more frames of monitoring sensor data;
    label the one or more frames of monitoring sensor data based on the analysis to generate a labelled dataset;
    output the labelled dataset.

2. The system of clause 1 wherein each frame of the one or more frames of monitoring sensor data comprises an instance of monitoring sensor data and a timestamp.

3. The system of clause 2, wherein the instance of monitoring sensor data comprises a single frame of video data, and the timestamp corresponds to the time at which the single frame of video data was detected.

4. The system of clause 2, wherein the instance of monitoring sensor data comprises a single instance of point cloud depth data, and the timestamp corresponds to the time at which the single instance of point cloud depth data was detected.

5. The system of clause 1, wherein the proximity sensor data comprises one or more timestamps and one or more unique object identifiers.

6. The system of clause 5, wherein the one or more unique identifiers are internet protocol, IP, addresses.

5. The system of clause 1, wherein the processor is further configured to receive positioning data indicating the position of the one or more objects of interest, and analyse the one or more frames of monitoring sensor data to identify, based on the proximity sensor data and the positioning data, one or more objects of interest present in the one or more frames of monitoring sensor data.

6. The system of clause 5, wherein the positioning data is global positioning system, GPS, data.

7. The system of clause 1, further comprising one or more monitoring sensors and one or more proximity sensors, wherein each monitoring sensor and each proximity sensor is configured such that the field of view or coverage of the one or more monitoring sensors and the one or more proximity sensors is aligned.

8. The system of clause 7, wherein the fields of view or coverage of the one or more monitoring sensors and one or more proximity sensors are congruent.

9. The system of clause 7, wherein the proximity sensor data comprises one or more timestamps and one or more unique identifiers; and each of the one or more timestamps represent times at which one or more objects of interest entered or left the coverage of the one or more proximity sensors.

9. A system for training a machine learning model, the system comprising:
  a processing means configured to:
    receive data labelled using the system of any preceding clause;
    train the machine learning model using the received data.

10. A detection system for detecting one or more objects of interest, the system comprising:
  an input module configured to receive monitoring sensor data comprising one or more frames;
  a machine learning model trained using the system of clause 9;
  a processor configured to:
    determine, using the machine learning model, whether any objects of interest are present in each frame of the one or more frames of monitoring sensor data.

11. The system of clause 10, wherein the system is further configured to track one or more vehicles within the field of view of the monitoring sensor data, based on the determination.

12. The system of clause 11, wherein the system is further configured to determine the likelihood of a collision between the one or more tracked vehicles.

The invention claimed is:

1. A system for generating a labelled dataset, the system comprising:
  processing means configured to:
    receive first data from one or more first sensors wherein the first data comprises one or more frames, each frame comprising an image or a point cloud and further comprising an associated timestamp indicating a time at which the image or point cloud was captured, and wherein the first data comprises data defining an object of interest within a predetermined area;
    receive second data from one or more second sensors wherein the second data is associated with the object of interest within the predetermined area, and wherein the second data comprises one or more unique object identifiers and a plurality of timestamps, at least one timestamp of the plurality of timestamps representing a time at which the object of interest entered the coverage of the one or more second sensors, and at least one timestamp of the plurality of timestamps representing a time at which the object of interest left the coverage of the one or more second sensors;
    analyse the one or more frames of the first data to identify, based on the second data, the object of interest present in the first data;
    label the one or more frames of the first data based on the analysis to generate a labelled dataset;
    output the labelled dataset.

2. The system of claim 1, wherein at least one of the one or more first sensors is a video camera configured to capture images of an area, and wherein at least one of the one or more second sensors is configured to detect radio frequency signals.

3. The system of claim 2, wherein each of the one or more first sensors and each of the one or more second sensors is configured such that the field of view or coverage of the one or more first sensors and the one or more second sensors is aligned.

4. The system of claim 1, wherein the first data is associated with two dimensional or three dimensional image data of the predetermined area, and wherein the second data is associated with radio frequency data.

5. The system of claim 1, wherein the first data comprises a single frame of video data and the timestamp corresponds to the time at which the single frame of video data was detected and/or wherein the first data comprises a single instance of point cloud depth data and the timestamp corresponds to the time at which the single instance of point cloud depth data was detected.

6. The system of claim 1, wherein the one or more unique identifiers are internet protocol, IP, addresses.

7. The system of claim 1, wherein the processing means is further configured to receive positioning data indicating the position of the object of interest, and analyse the one or more frames of the first data to identify, based on the second data and the positioning data, the object of interest present in the one or more frames of the first data.

8. A detection system for detecting one or more objects of interest, the detection system comprising:
   an input module configured to receive first sensor data comprising one or more frames;
   a machine learning model trained using a training system comprising a processing means configured to:
   receive data labelled using the system of claim 1; and
   train the machine learning model using the received data; and
   a processing means configured to:
   determine, using the machine learning model, whether any objects of interest are present in each frame of the one or more frames of the first sensor data.

9. The detection system of claim 8, wherein the detection system is further configured to track one or more vehicles within the field of view of the first sensor data, based on the determination.

10. The detection system of claim 9, wherein the detection system is further configured to determine a likelihood of a collision between the one or more tracked vehicles.

11. The detection system of claim 8, wherein the detection system is further configured to detect when an object of interest enters the predetermined area and generate an entry timestamp corresponding to the time at which the object of interest enters the predetermined area.

12. The detection system of claim 8, wherein the detection system is further configured to detect when the object of interest exits the predetermined area and generate an exit timestamp corresponding to the time at which the object of interest leaves the predetermined area.

13. The system of claim 1, wherein the system is further configured to determine a period of time during which the object of interest is within the predetermined area.

14. The system of claim 13, wherein the system is further configured to generate the labelled dataset only when the period of time is greater than a predetermined threshold.

15. The system of claim 1, further comprising a module which is configured to adjust the range of the one or more second sensors in response to a range adjust command.

16. The system of claim 1, wherein the system is further configured to determine a size of a further object or a length or width of a further object and preferably wherein the size, length or width is determined by comparing a detected identifier associated with the further object with a look-up table of identifiers and associated sizes, lengths or widths of the further object.

17. The system of claim 16, further comprising a module which is configured to adjust the range of the one or more second sensors based on the determined size or length or width of the further object.

18. The system of claim 1, wherein the system is further configured to determine one or more sub sectors within the predetermined area based on triangulation of radio frequency signals from a plurality of signal detectors, wherein the labelled data set is only generated for objects which are not within one or more of the subsectors.

19. A method for generating a labelled dataset, the method comprising:
   receiving first data from one or more first sensors wherein the first data comprises one or more frames, each frame comprising an image or a point cloud and further comprising an associated timestamp indicating a time at which the image or point cloud was captured, and wherein the first data comprises data defining an object of interest within a predetermined area;
   receiving second data from one or more second sensors wherein the second data is associated with the object of interest within the predetermined area, and wherein the second data comprises one or more unique object identifiers and one or more timestamps representing times at which the object of interest entered or left the coverage of the one or more second sensors;
   analysing the one or more frames of the first data to identify, based on the second data, the object of interest present in the first data; and
   labelling the one or more frames of the first data based on the analysis to generate a labelled dataset.

* * * * *